(12) United States Patent
Oltheten

(10) Patent No.: US 9,902,502 B2
(45) Date of Patent: *Feb. 27, 2018

(54) SUPER CAPACITOR BASED EMERGENCY LIGHTING SYSTEM

(71) Applicant: BELL HELICOPTER TEXTRON INC., Fort Worth, TX (US)

(72) Inventor: Erik John Oltheten, Fort Worth, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 49 days.

This patent is subject to a terminal disclaimer.

(21) Appl. No.: 14/870,796

(22) Filed: Sep. 30, 2015

(65) Prior Publication Data

US 2017/0088286 A1 Mar. 30, 2017

(51) Int. Cl.
| | |
|---|---|
| H05B 37/02 | (2006.01) |
| B64D 45/00 | (2006.01) |
| H05B 33/08 | (2006.01) |
| B64D 47/02 | (2006.01) |
| G02B 5/02 | (2006.01) |
| G09F 13/22 | (2006.01) |
| H01G 11/00 | (2013.01) |

(52) U.S. Cl.
CPC ......... *B64D 45/0015* (2013.01); *B64D 45/00* (2013.01); *B64D 47/02* (2013.01); *G02B 5/0284* (2013.01); *G09F 13/22* (2013.01); *H01G 11/00* (2013.01); *H05B 33/0806* (2013.01); *H05B 33/0812* (2013.01); *H05B 33/0815* (2013.01); *B64D 2045/007* (2013.01); *B64D 2203/00* (2013.01); *G09F 2013/222* (2013.01); *Y02B 20/343* (2013.01)

(58) Field of Classification Search
CPC ............ H05B 33/0803; H05B 33/0806; H05B 33/0815; B60Q 3/0256; B60Q 3/0259; B60Q 3/0283; B60Q 3/0293
USPC .......................... 315/76, 77, 86, 88, 119, 291
See application file for complete search history.

(56) References Cited

U.S. PATENT DOCUMENTS

| | | | | |
|---|---|---|---|---|
| 4,365,232 A | * | 12/1982 | Miller ..................... | G08B 7/062 340/945 |
| 5,739,639 A | * | 4/1998 | Johnson ................... | H02J 9/061 307/64 |
| 7,573,396 B2 | * | 8/2009 | Stokes .................... | B64D 11/00 307/10.8 |
| 8,274,175 B2 | | 9/2012 | Tabell | |
| 8,686,662 B1 | | 4/2014 | Bragg | |

(Continued)

FOREIGN PATENT DOCUMENTS

| | | |
|---|---|---|
| DE | 102008036470 A1 | 8/2008 |
| EP | 2857262 A1 | 4/2015 |
| WO | 2005/060067 A1 | 6/2005 |

OTHER PUBLICATIONS

Extended European Search Report dated Feb. 23, 2017 from counterpart EP App. No. 16 19 0485, 10 pages.

(Continued)

*Primary Examiner* — Tung X Le
(74) *Attorney, Agent, or Firm* — James E. Wilson

(57) ABSTRACT

An emergency lighting system (ELS) for an aircraft has a capacitor, at least one of an onboard power system and a ground power unit configured to charge the capacitor, and a light emitting diode (LED) selectively powered by the capacitor.

6 Claims, 8 Drawing Sheets

(56) References Cited

U.S. PATENT DOCUMENTS

| | | |
|---|---|---|
| 2006/0114419 A1 | 6/2006 | Peterson et al. |
| 2009/0261732 A1* | 10/2009 | Bouchard .............. B60Q 11/00 315/82 |
| 2010/0033980 A1* | 2/2010 | Vogel ................... B60Q 3/0256 362/471 |
| 2013/0033895 A1 | 2/2013 | Brown et al. |
| 2015/0091438 A1* | 4/2015 | Von Heimendahl . B60Q 3/0256 315/77 |
| 2015/0108895 A1* | 4/2015 | Trinschek .......... H05B 33/0803 315/86 |
| 2015/0151679 A1* | 6/2015 | Aruga ................... B64D 47/02 362/470 |
| 2016/0216417 A1 | 7/2016 | Cross et al. |

OTHER PUBLICATIONS

Office Action dated Aug. 24, 2017 from counterpart CA App. No. 2,943,536.

Office Action dated Nov. 27, 2017 from counterpart EP App. No. 16190485.9.

\* cited by examiner

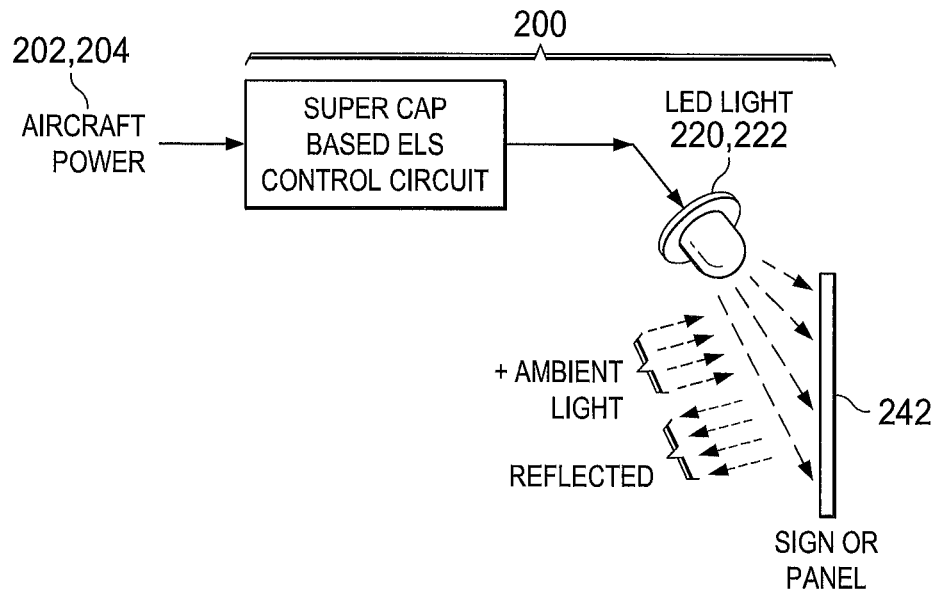
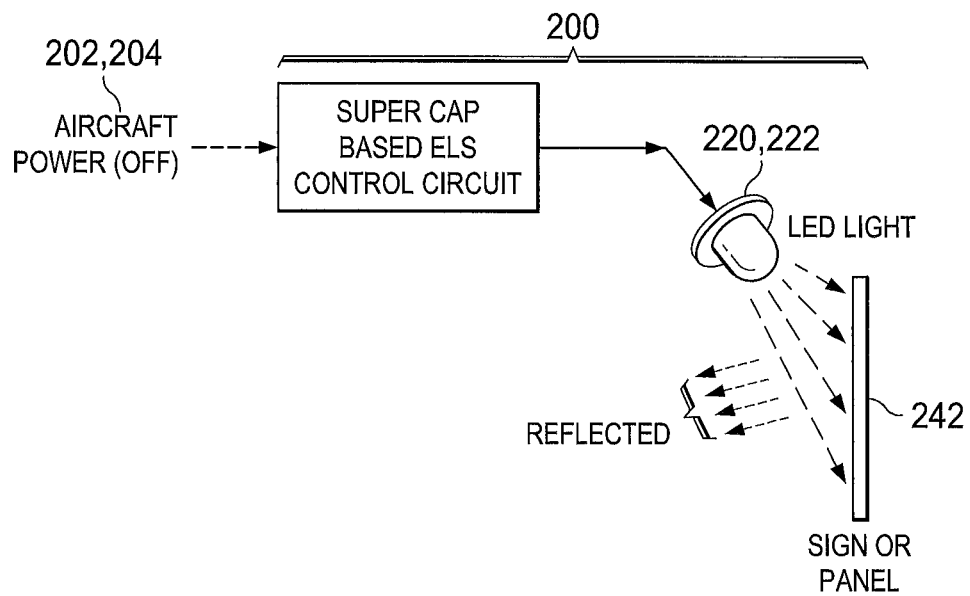

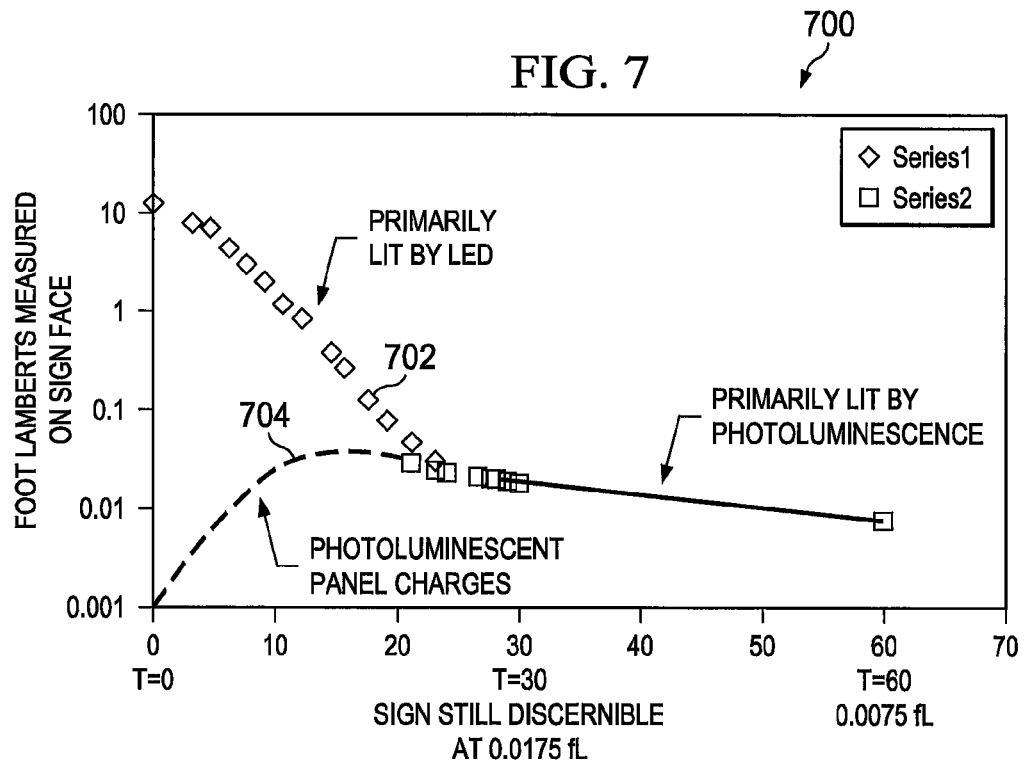
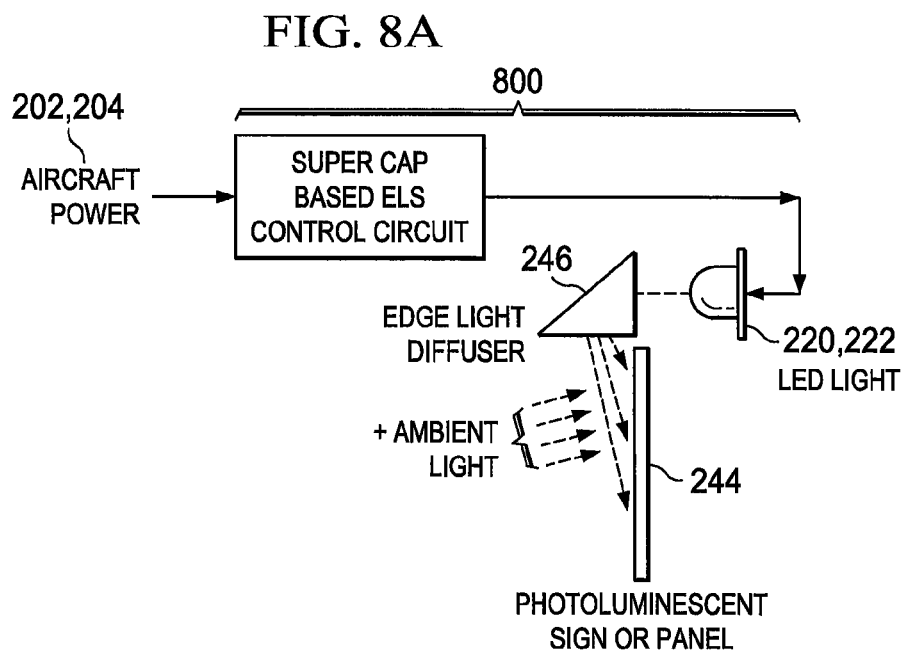

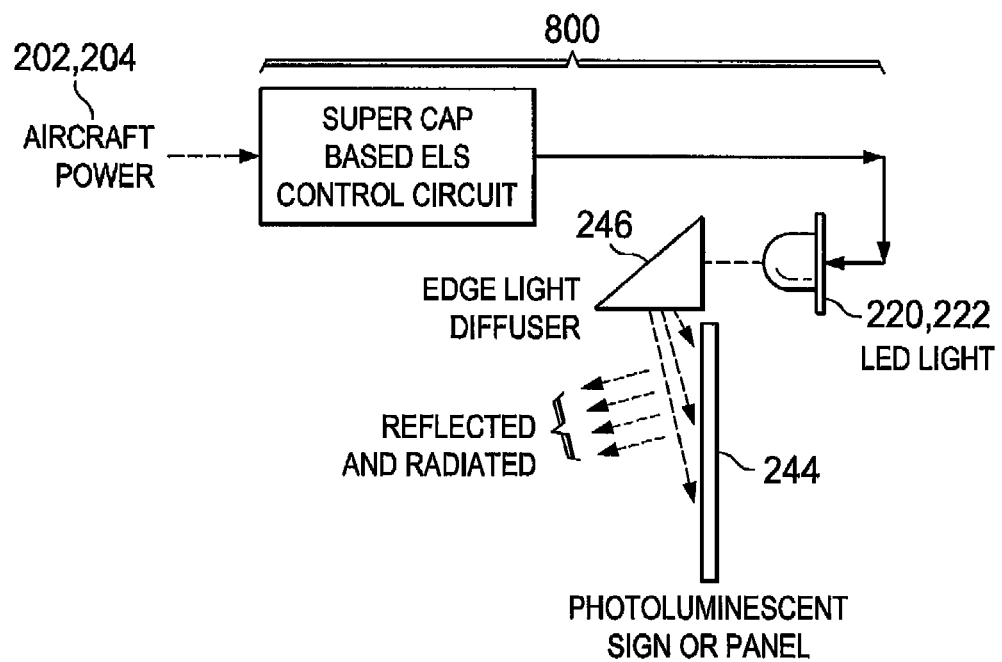
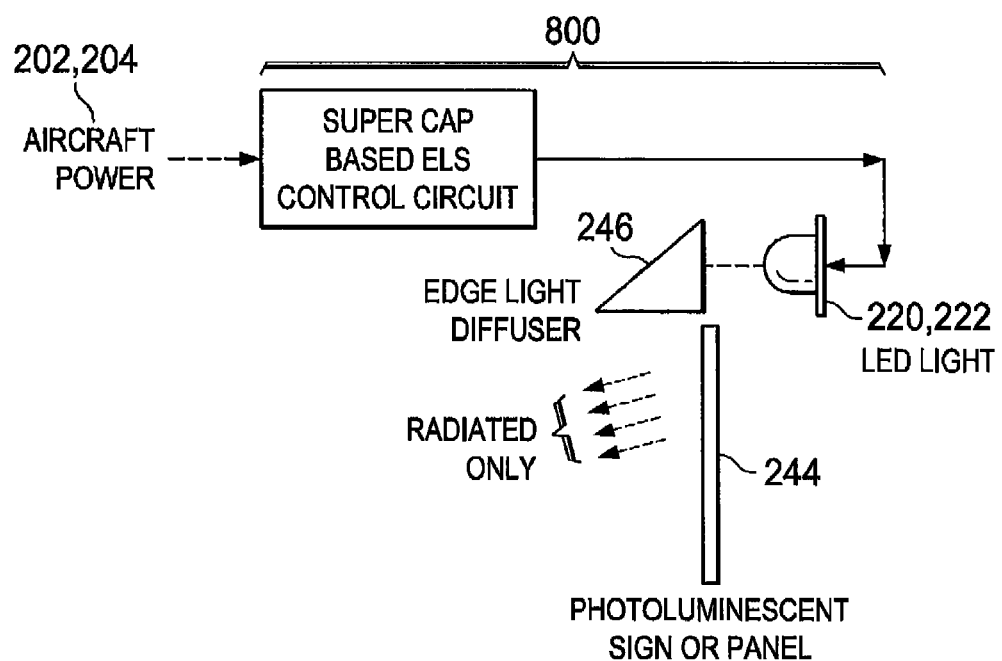

SUPER CAPACITOR BASED EMERGENCY LIGHTING SYSTEM

CROSS-REFERENCE TO RELATED APPLICATIONS

This application is technically related to commonly-owned, co-pending. U.S. patent application entitled "Hybrid Emergency Exit Lighting System," Ser. No. 14/870,930, by inventor Erik John Oltheten, filed on 30 Sep. 2015, which is incorporated herein by reference for all purposes.

BACKGROUND

1. Field of the Invention

The present application relates to lighting systems. In particular, the present application relates to rechargeable emergency lighting systems for vehicles, including, but not limited to, aircraft.

2. Description of Related Art

Some aircraft comprise emergency lighting systems for use when a power supply to a primary lighting system is interrupted. In some cases, the emergency lighting systems comprise rechargeable batteries and/or light emitting diodes. In some cases, the rechargeable batteries of the emergency lighting systems prematurely fail or perform poorly as a result of recharging and discharging the batteries in accordance with field conditions that are undesirable for maintenance and/or performance of the batteries. There are many known ways to provide emergency lighting systems, however, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 3A is a simplified view of the emergency lighting system of FIG. 2 in operation with external power provided.

FIG. 3B is a simplified view of the emergency lighting system of FIG. 2 in operation with external power removed and internal power being utilized.

FIG. 7 is a chart showing the visibility of a photoluminescent panel of the emergency lighting system of FIG. 5A over a period of time.

FIG. 8A is a simplified view of an alternative embodiment of an emergency lighting in operation with external power provided.

FIG. 8B is a simplified view of the emergency lighting system of FIG. 8A in operation with external power removed and internal power being utilized.

FIG. 8C is a simplified view of the emergency lighting system of FIG. 8A in operation with external power removed and without utilization of internal power.

Figure 1:
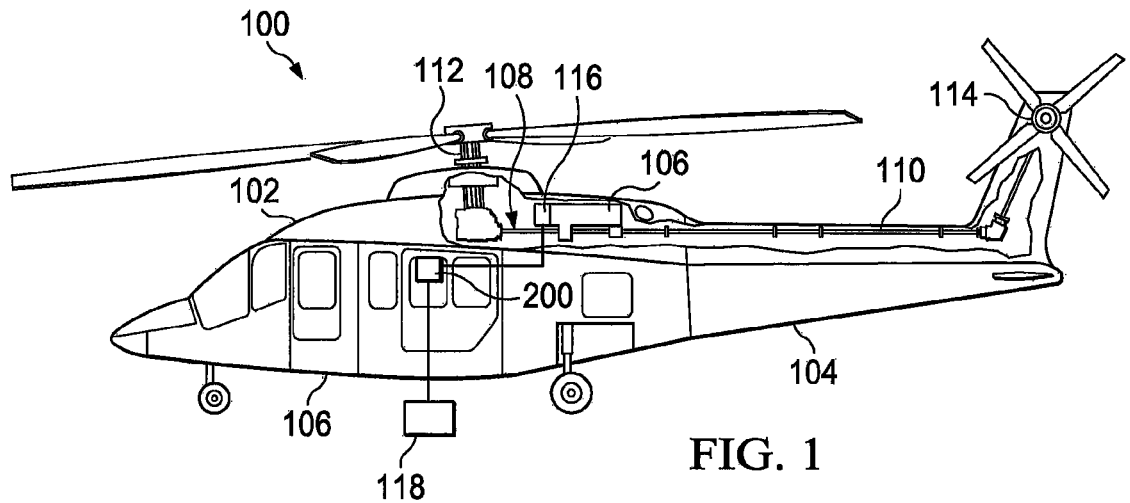
FIG. 1 is an orthogonal schematic side view of a helicopter according to the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIG. 1 in the drawings, a helicopter 100 according to the present disclosure is shown. The helicopter 100 generally comprises a fuselage 102, a tail boom 104, an engine 106, a main rotor drive system 108, and a tail rotor drive system 110. The main rotor drive system 108 is coupled to the engine 106 to drive a primary rotor mast 112. The tail rotor drive system 110 is coupled to the engine 106 to drive a tail rotor mast 114. The helicopter 100 further comprises an emergency lighting system 200 configured to selectively emit light within and/or on the helicopter 100. In some cases, the emergency lighting system 200 is provided electrical power from an onboard power system 116 that can be driven by the engine 106. In some cases, the emergency lighting system 200 is provided electrical power from a ground power unit 118 that can be connected to the electrical systems of the helicopter 100 to supply electrical energy to the helicopter 100 when the helicopter is grounded.

Figure 2:
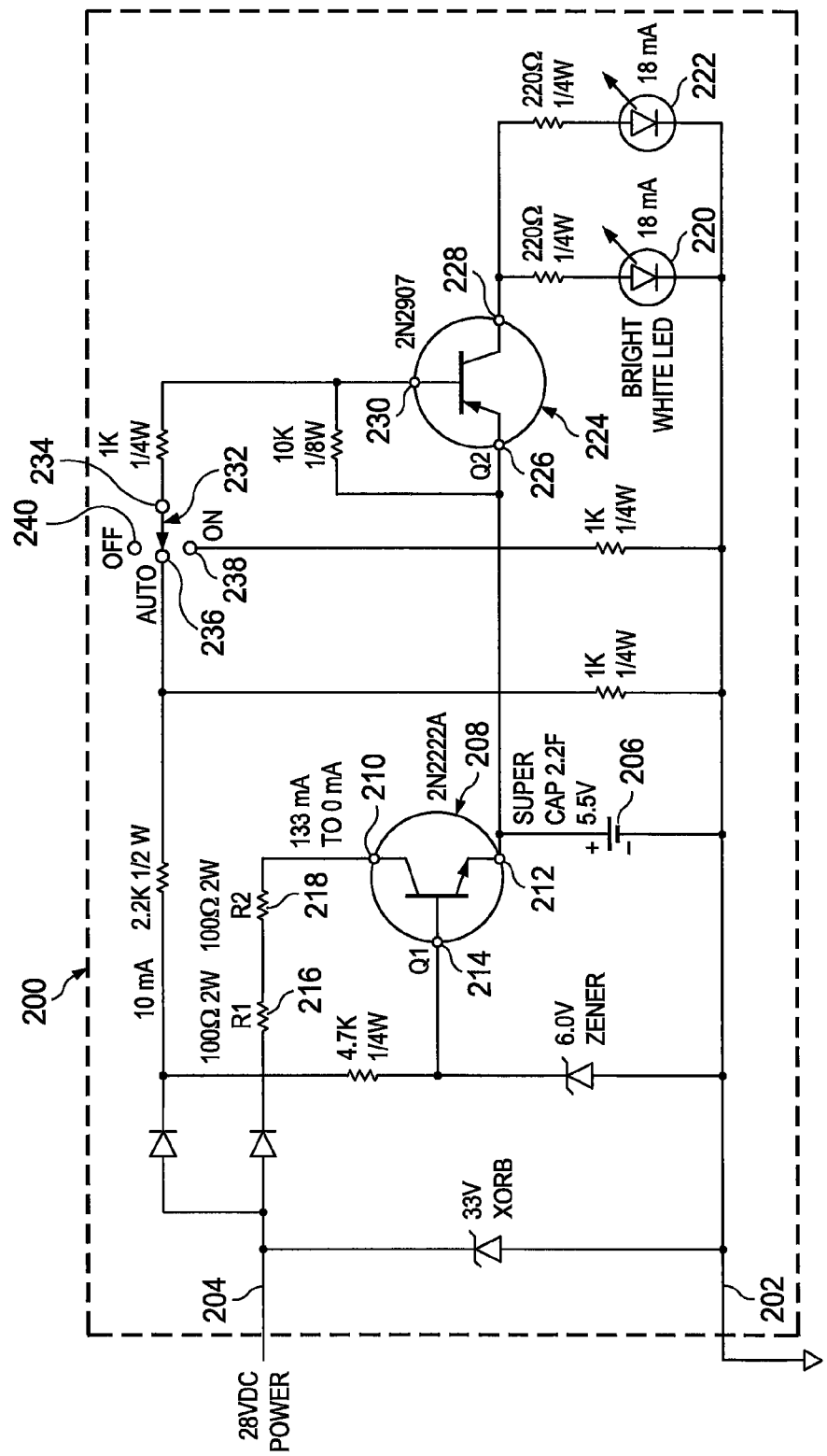
FIG. 2 is a schematic of an emergency lighting system of the helicopter of FIG. 1.

Referring now to FIG. 2, a schematic diagram of the electrical components of the emergency lighting system (ELS) 200 is shown. Most generally, the ELS 200 is configured to receive direct current voltage of about 28 volts. In some embodiments, the ELS 200 comprises a ground connection 202 and a positive connection 204 which are selectively connected to external power sources, such as, but not limited to, the onboard power system 116 and the ground power unit 118. In some embodiments, the ELS 200 is generally configured to selectively charge a capacitor or supercapacitor 206. A transistor, 208 is used to switch between providing electrical charge to the supercapacitor 206 and not providing electrical charge to the supercapacitor 206. The transistor 208 comprises an NPN type transistor comprising a collector 210, an emitter 212, and a base 214. When a charge is applied to the base 214 that is relatively more positive than a charge applied to the emitter 212, the transistor 208 is opened and allows electrical energy to flow from each of the collector 210 and base 214 to the emitter 212. The ELS 200 further comprises resistors 216 and 218, each configured as 100 ohm resistors with a current rating of 2 watts, which regulate a rate at which electrical energy is supplied to collector 210 when the transistor 208 is open. The transistor 208 may comprise a so-called 2N2222 transistor which is a commercially available NPN bipolar junction transistor suitable for use in switching applications.

The supercapacitor 206 is connected between the emitter 212 and the ground connection 202. Accordingly, when the transistor 208 is open, electrical energy flows through the transistor 208 to the supercapacitor 206. Depending on the charge state of the supercapacitor 206, the supercapacitor 206 can receive and store electrical energy provided from the transistor 208. Because the resistors 216 and 218 are disposed in series with the collector 210, the rate at which energy is provided to the supercapacitor 206 through the transistor 208 is determined as a function of the sum of the resistance of the resistors 216 and 218. The supercapacitor 206 comprises an electrical energy storage capacity of 2.2 Fared at 5.5 volts. As shown, the ELS 200 is configured to supply between about 0 to about 133 milliamps of current through the transistor 208.

The ELS 200 further comprises light emitting diodes (LEDs) 220 and 222, each being rated for 18 milliamps of current. In this embodiment, the LEDs 220 and 222 are considered bright white LEDs. As shown, electrical energy is switched between being provided to the LEDs 220 and 220 and not provided to the LEDs 220, 222 by a transistor 224. The transistor 224 comprises a PNP type transistor comprising a collector 226, an emitter 228, and a base 230. When a charge is applied to the emitter 228 that is relatively more positive than a charge applied to the base 230, the transistor 224 is opened and allows electrical energy to flow from the collector 226 to the emitter 228. The transistor 224 may comprise a so-called 2N2907 transistor which is a commercially available PNP bipolar junction transistor suitable for use in switching applications.

The ELS 200 further comprises a multi-position switch 232 configured to control the behavior of the ELS 200. The switch 232 comprises a common node 234, an Auto node 236, an On node 238, and an Off node 240. Most generally, when the switch 232 is configured to electrically connect the common node 234 and the Off node 240, the LEDs 220, 222 are not provided with power, regardless of the state of whether external power is supplied to the ELS 200 and regardless of whether the supercapacitor 206 is sufficiently charged to power the LEDs 220, 222. Operation of the ELS 200 can be utilized during night operations in which it may be desirable for the helicopter 100 to remain dark, such as, but not limited to, situations in which night vision goggles are utilized by occupants of the helicopter 100. When the switch 232 is configured to electrically connect the common node 234 and the On node 238, the LEDs 220, 222 are provided with power from at least one of external power supplied to the ELS 200 and the supercapacitor 206. When the switch is configured to electrically connect the common node 234 and the Auto node 236, the LEDs 220, 222 are not supplied power when external power is supplied to the ELS 200 but the LEDs 220, 222 are supplied power from the supercapacitor 206 when the external power is not supplied to the ELS 200. The ELS 200 can further comprise a sign or panel 242 configured and/or disposed relative to the LEDs 220, 222 to be exposed to the photons or light energy emitted by the LEDs 220, 222.

Figure 3C:
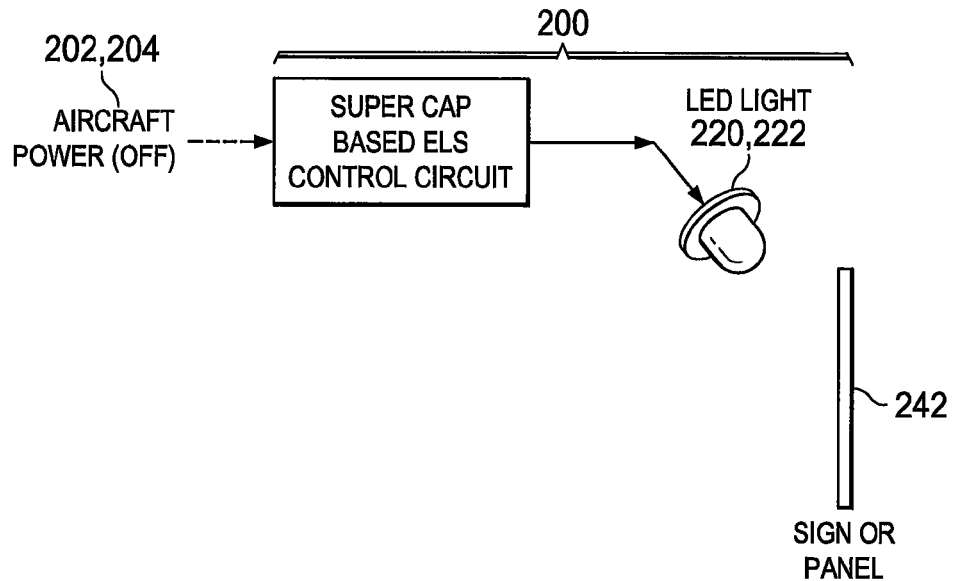
FIG. 3C is a simplified view of the emergency lighting system of FIG. 2 in operation with external power removed and without utilization of internal power.

Referring now to FIGS. 3A-3B, example progressive operation of the ELS 200 is shown schematically. FIG. 3A shows operation of the ELS 200 with the switch 232 set to connect the On node 238 to the common node 234. While external power is supplied to the ELS 200, both ambient light from other lighting systems and light from the LEDs 220, 222 are cast onto a sign or panel 242. Accordingly, light is reflected from the panel 242 and the panel 242 is visible. FIG. 3B shows operation of the ELS 200 with the switch 232 continuing to connect the On node 238 to the common node 234, but no external power supplied to the ELS 200. Without the other primary lighting systems providing ambient light, the majority of light cast onto the sign or panel 242 is light emitted from the now supercapacitor powered LEDs 220, 222. Accordingly, the light reflected from the sign or panel 242 is primarily resultant from the operation of the LEDs 220, 222. FIG. 3C shows an operational state of the ELS 200 when both the external power is not provided to the ELS 200 and the supercapacitor of the ELS 200 has expended stored energy to a point that LEDs 220, 222 cannot be powered. Because the LEDs 220, 222 are not powered and there is no other primary lighting system operating, little or no light is cast onto the sign or panel 242 and the sign or panel 242 reflects no appreciable light and is therefore not visible or barely visible.

Figure 4:
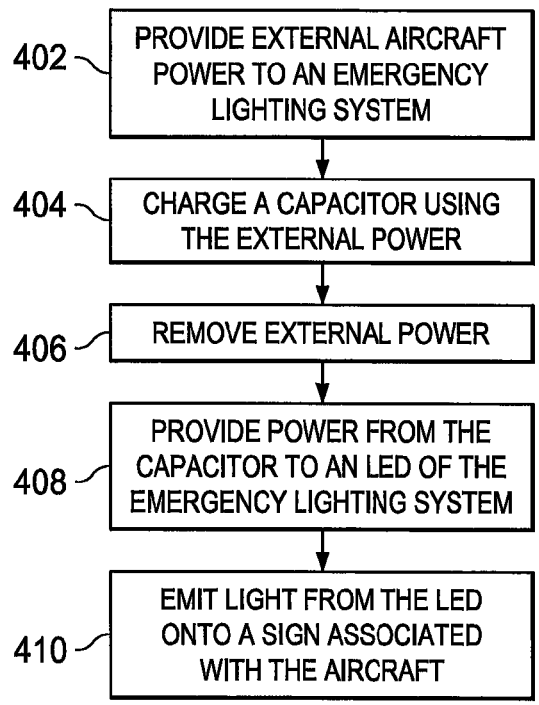
FIG. 4 is a flowchart of a method of operating the emergency lighting system of FIG. 2.

Referring now to FIG. 4, a flowchart of a method 400 of operating the ELS 200 is shown. The method 400 may begin at block 402 where external aircraft power, such as, but not limited to, power from an onboard power system 116 or ground power unit 118, is provided to the ELS 200. The method 400 may continue at block 404 where a capacitor, such as, but not limited to, a supercapacitor 206 is charged by the power supplied from the external aircraft power. The method 400 may continue at block 406 where the external aircraft power is removed, such as, but not limited to, due to an emergency related to failure of an onboard power system 116 and/or a temporary lack of external power due to disconnection and/or failure of a ground power unit 118. The method 400 may continue at block 408 where as a function of the switch 232 being set to connect the common node 234 to either the On node 238 or the Auto node 236, power is provided from the supercapacitor 206 to an LED of the ELS 200. The method 400 may continue at block 410 where the LED that is powered by the supercapacitor 206 emits light and the light is cast onto a sign or panel 242, thereby making the sign or panel 242 visible in spite of the lack of external power.

Figure 5A:
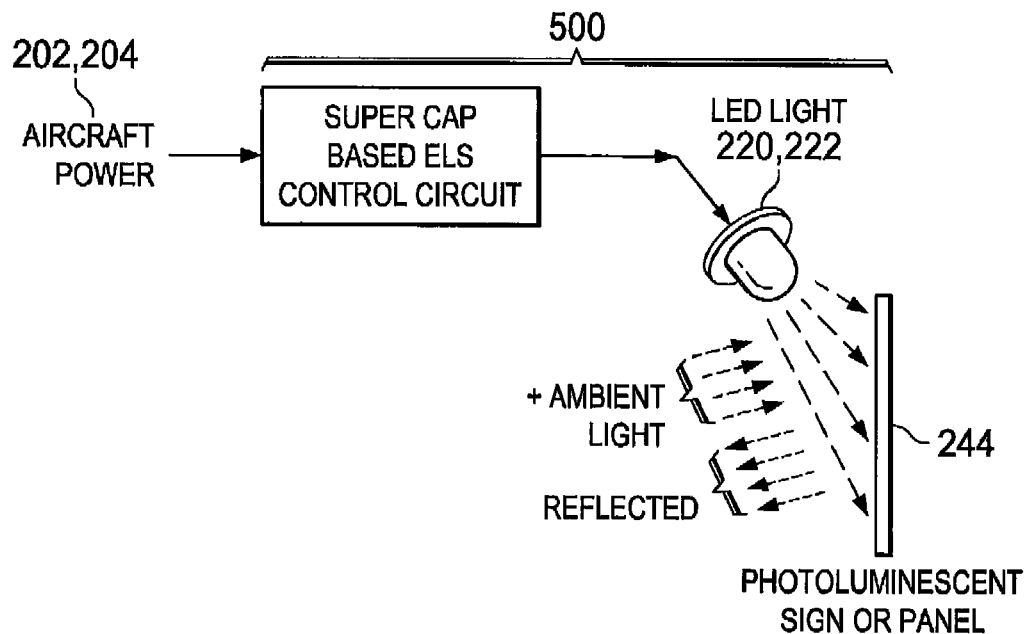
FIG. 5A is a simplified view of an alternative embodiment of an emergency lighting in operation with external power provided.
Figure 5B:
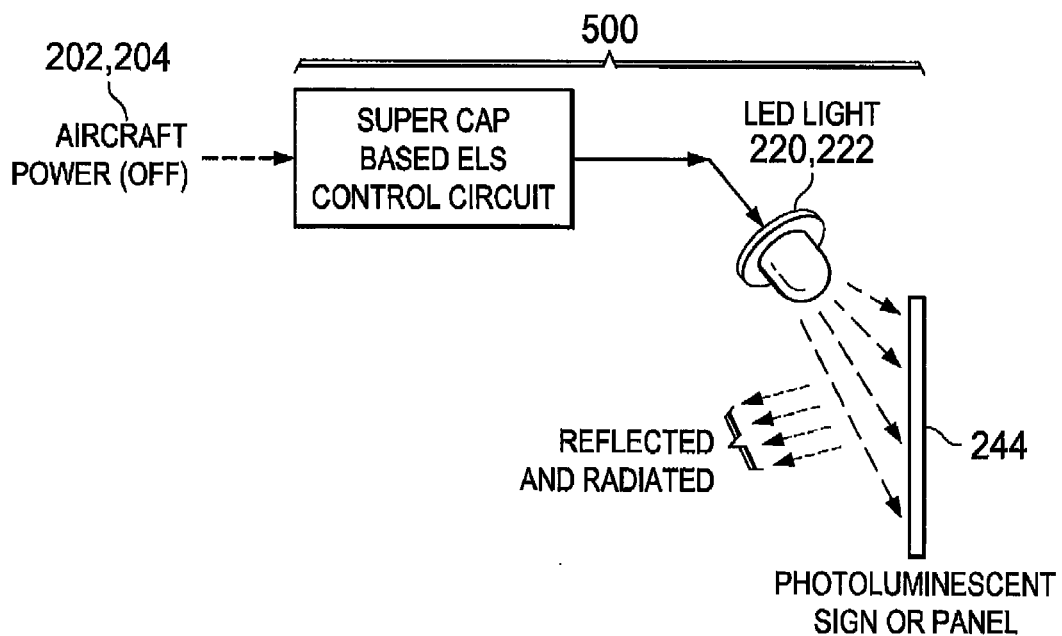
FIG. 5B is a simplified view of the emergency lighting system of FIG. 5A in operation with external power removed and internal power being utilized.
Figure 5C:
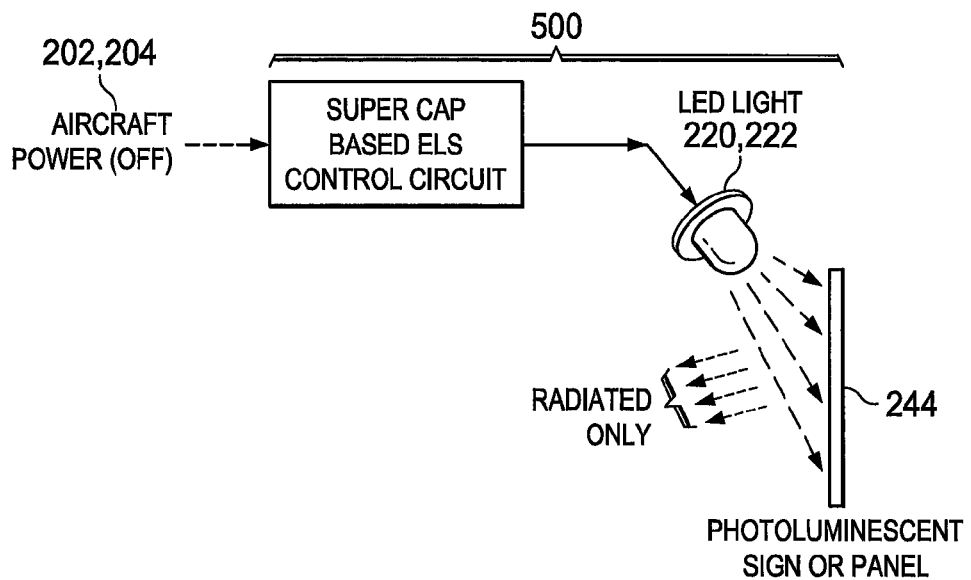
FIG. 5C is a simplified view of the emergency lighting system of FIG. 5A in operation with external power removed and without utilization of internal power.

Referring now to FIGS. 5A-5B, example progressive operation of an ELS 500 is shown schematically. ELS 500 is substantially similar to ELS 200 but further comprises a photoluminescent sign or panel 244 rather than a non-photoluminescent sign or panel such as sign or panel 242. FIG. 5A shows operation of the ELS 500 with the switch 232 set to connect the On node 238 to the common node 234 and with the photoluminescent sign or panel 244 in an initial uncharged state in which the panel 244 does not radiate photons or light energy. While external power is supplied to the ELS 500, both ambient light from other lighting systems and light from the LEDs 220, 222 are cast onto the photoluminescent sign or panel 244. Accordingly, light is reflected from the panel 244 and the panel 244 is visible. FIG. 5B shows operation of the ELS 500 with the switch 232 continuing to connect the On node 238 to the common node 234, but no external power supplied to the ELS 500. Without the other primary lighting systems providing ambient light, the majority of light cast onto the sign or panel 244 is light emitted from the now supercapacitor powered LEDs 220, 222. Accordingly, the light reflected from the sign or panel 244 is primarily resultant from the operation of the LEDs 220, 222. However, unlike operation of ELS 200, since the photoluminescent panel 244 has received and stored light energy in the previous operational state of FIG. 5A, in addition to the light being reflected from the panel 244 the panel 244 emits and/or radiates photons, light, and/or light energy as a function of the panel 244 discharging. FIG. 5C shows an operational state of the ELS 500 when both the external power is not provided to the ELS 500 and the supercapacitor of the ELS 500 has expended stored energy to a point that LEDs 220, 222 cannot be powered. Because the LEDs 220, 222 are not powered and there is no other primary lighting system operating, little or no light is cast onto the sign or panel 244 and the sign or panel 244 reflects no appreciable light. However, unlike operation of ELS 200, the panel 244 can nonetheless continue to emit and/or radiate photons, light, and/or light energy and therefore remain visible during the discharge of the panel 244.

Figure 6:
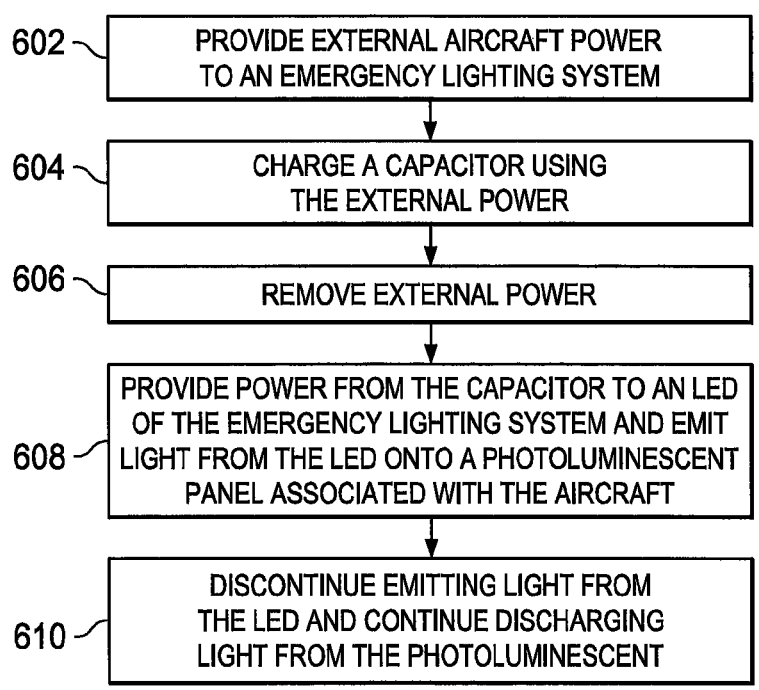
FIG. 6 is a flowchart of a method of operating the emergency lighting system of FIG. 5A.

Referring now to FIG. 6, a flowchart of a method 600 of operating the ELS 500 is shown. The method 600 may begin at block 602 where external aircraft power, such as, but not limited to, power from an onboard power system 116 or ground power unit 118, is provided to the ELS 500. The method 600 may continue at block 604 where a capacitor, such as, but not limited to, a supercapacitor 206 is charged by the power supplied from the external aircraft power. The method 600 may continue at block 606 where the external aircraft power is removed, such as, but not limited to, due to an emergency related to failure of an onboard power system 116 and/or a temporary lack of external power due to disconnection and/or failure of a ground power unit 118. The method 600 may continue at block 608 where as a function of the switch 232 being set to connect the common node 234 to either the On node 238 or the Auto node 236, power is provided from the supercapacitor 206 to an LED of the ELS 500 and the LED that is powered by the supercapacitor 206 emits light and/or casts light onto a photoluminescent sign or panel 244, thereby making the sign or panel 244 visible in spite of the lack of external power while also charging the photoluminescent sign or panel 244. The method 600 may continue at block 610 where emission of light from the LED is discontinued and the panel 244 continues to emit or radiate light, photons, and/or light energy. Accordingly, the panel 244 can remain visible during the discharging of the panel 244.

Referring now to FIG. 7, a chart 700 displays the interplay between visibility of a photoluminescent sign or panel, such as panel 244, as a function of being primarily lit by the supercapacitor powered LEDs and thereafter being primarily visible by photoluminescence of the panel 244 itself. The chart 700 comprises a first curve 702 which represents the measured intensity of illumination of the panel 244 over time during which illumination of the panel 244 is primarily visible as a function of operation of the supercapacitor powered LEDs. The chart 700 further comprises a second curve 704 which represents the intensity of light discharged from the panel 244 as a function of the photoluminescent discharge of the panel 244. It is shown that during the operation of the LEDs, a period lasting about 25 minutes, the photoluminescent charge of the panel 244 generally increases for about the first 15 minutes. After about 15 minutes, the intensity of the LEDs powered by the supercapacitor is not sufficient to further charge the panel 244 and the panel 244 begins to discharge. After about 20 minutes of operation, the illumination of the panel 244 is beginning to be significantly more attributable to the photoluminescent discharge of the panel 244 and eventually the illumination is fully attributable to the discharge of the panel 244. In this embodiment, the panel 244 remains visibly discernable after 30 minutes of operation even though the LEDs have discontinued contributing to the illumination of the panel 244.

Referring now to FIGS. 8A-8B, example progressive operation of an ELS 800 is shown schematically. ELS 800 is substantially similar to ELS 500 but further comprises an edge light diffuser 246. The edge light diffuser 246 is disposed relative to each of the LEDs 220, 222 and the photoluminescent panel 244 so that although the panel 244 is not primarily located within a primary emission pattern of the LEDs 220, 222, the light emitted from the LEDs 220, 222 is received by the diffuser 246 and redirected onto the panel 244. Accordingly, the addition of the edge light diffuser 246 can allow alternative physical packaging configurations of the ELS 800 wherein panel 244 (or panel 242) can be illuminated by the LEDs 220, 222 despite being located outside a typical radiation pattern of the LEDs 220, 222. FIG. 8A shows operation of the ELS 800 with the switch 232 set to connect the On node 238 to the common node 234 and with the photoluminescent sign or panel 244 in an initial uncharged state in which the panel 244 does not radiate photons or light energy. While external power is supplied to the ELS 800, both ambient light from other lighting systems and light from the LEDs 220, 222 are cast onto the photoluminescent sign or panel 244. The light from the LEDs 220, 222 is routed to the panel 244 through the edge light diffuser 246. Accordingly, light is reflected from the panel 244 and the panel 244 is visible. FIG. 8B shows operation of the ELS 800 with the switch 232 continuing to connect the On node 238 to the common node 234, but no external power supplied to the ELS 800. Without the other primary lighting systems providing ambient light, the majority of light cast onto the sign or panel 244 is light emitted from the now supercapacitor powered LEDs 220, 222 and through the diffuser 246. Accordingly, the light reflected from the sign or panel 244 is primarily resultant from the operation of the LEDs 220, 222 and optical redirection provided by the diffuser 246. However, unlike operation of ELS 200, since the photoluminescent panel 244 has received and stored light energy in the previous operational state of FIG. 8A, in addition to the light being reflected from the panel 244, the panel 244 emits and/or radiates photons, light, and/or light energy as a function of the panel 244 discharging. FIG. 8C shows an operational state of the ELS 800 when both the external power is not provided to the ELS 800 and the supercapacitor of the ELS 800 has expended stored energy to a point that LEDs 220, 222 cannot be powered. Because the LEDs 220, 222 are not powered and there is no other primary lighting system operating, little or no light is cast onto the sign or panel 244 and the sign or panel 244 reflects no appreciable light. However, unlike operation of ELS 200, the panel 244 can nonetheless continue to emit and/or radiate photons, light, and/or light energy and therefore remain visible during the discharge of the panel 244.

Figure 9:
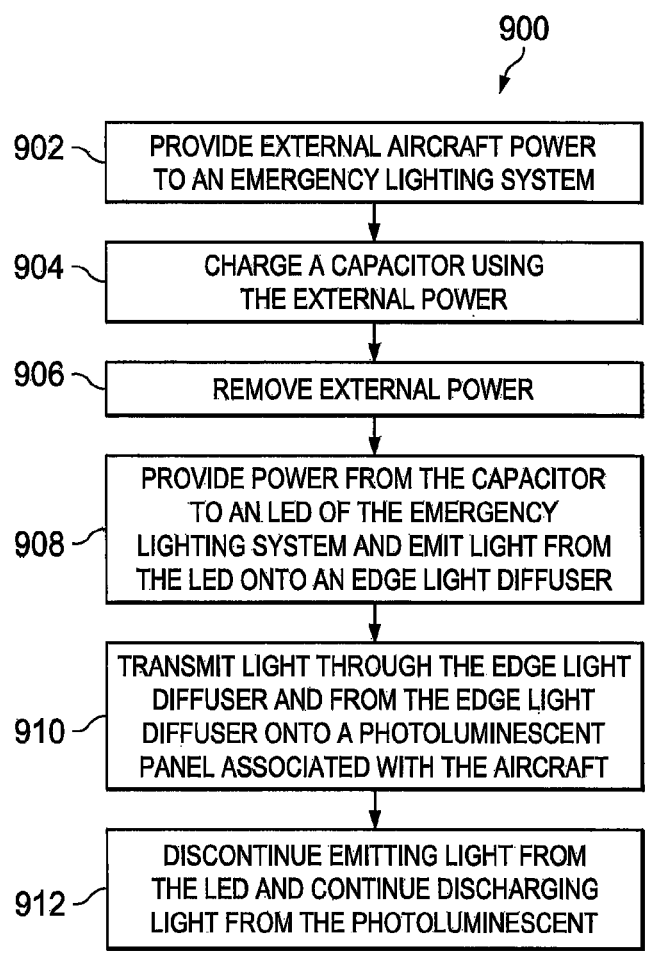
FIG. 9 is a flowchart of a method of operating the emergency lighting system of FIG. 8A.

Referring now to FIG. 9, a flowchart of a method 900 of operating the ELS 800 is shown. The method 900 may begin at block 902 where external aircraft power, such as, but not limited to, power from an onboard power system 116 or ground power unit 118, is provided to the ELS 800. The method 900 may continue at block 904 where a capacitor, such as, but not limited to, a supercapacitor 206 is charged by the power supplied from the external aircraft power. The method 900 may continue at block 906 where the external aircraft power is removed, such as, but not limited to, due to an emergency related to failure of an onboard power system 116 and/or a temporary lack of external power due to disconnection and/or failure of a ground power unit 118. The method 900 may continue at block 908 where as a function of the switch 232 being set to connect the common node 234 to either the On node 238 or the Auto node 236, power is provided from the supercapacitor 206 onto an edge light diffuser, such as edge light diffuser 246. The method 900 may continue at block 910 where light is transmitted through the edge light diffuser and from the edge light diffuser onto a photoluminescent sign or panel, such as panel 244, thereby making the sign or panel 244 visible in spite of the lack of external power while also charging the photoluminescent sign or panel 244. The method 900 may continue at block 912 where emission of light from the LED is discontinued and the panel 244 continues to emit or radiate light, photons, and/or light energy. Accordingly, the panel 244 can remain visible during the discharging of the panel 244.

In alternative embodiments, the values and/or ratings of electrical components of ELS 200, 500, 800 can be varied to provide different rates of supercapacitor 206 charging and discharging and/or LED 220, 220 intensity. Further, because performance of a photoluminescent sign or panel such as panel 244 is dependent upon the chemical makeup of the photoluminescent material and the amount of photoluminescent material utilized, alternative embodiments can provide photoluminescent discharge for different durations of time as well as different photoluminescent discharge intensities. In some embodiments, the signs or panels can be disposed within a cabin and/or cockpit of an aircraft. In some embodiments, an ELS 200, 500, 800 may additionally and/or alternatively provide ambient lighting to a cabin and/or cockpit of an aircraft. In some embodiments, at least one of an onboard power system 116 and a ground power unit 118 can comprise a portion of the ELS 200, 500, 800.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. An aircraft, comprising:
   onboard power supply; and
   an emergency lighting system (ELS), comprising:
   a capacitor;
   a light emitting diode (LED) selectively powered by the capacitor;
   a first transistor electrically disposed between the onboard power supply and the capacitor to selectively control charging of the capacitor with power from the onboard power supply; and
   a multi-position switch comprising an common node, an On node associated with an On mode of operation of the ELS, an Auto node associated with an Auto mode of operation of the ELS, and an Off node associated with an Off mode of operation of the ELS;
   wherein the capacitor maintains a charge while the multi-position switch is in the Off mode of operation.

2. The aircraft of claim 1, further comprising:
   at least one of a sign and a panel disposed relative to the LED so that light emitted from the LED is cast upon at least one of the sign and the panel.

3. The aircraft of claim 1, further comprising:
   a transistor configured to selectively direct electrical energy from the capacitor to the LED.

4. The aircraft of claim 1, wherein the Off mode of operation prevents the LED from emitting light.

5. The aircraft of claim 1, wherein the On mode of operation causes the LED to emit light from at least one of the onboard power supply and the capacitor when power is available from at least one of the onboard power supply and the capacitor.

6. The aircraft of claim 1, wherein the Auto mode of operation causes the LED to emit light when the onboard power supply is not providing power and the capacitor is sufficiently charged to power the LED.

* * * * *